Patented Apr. 15, 1930

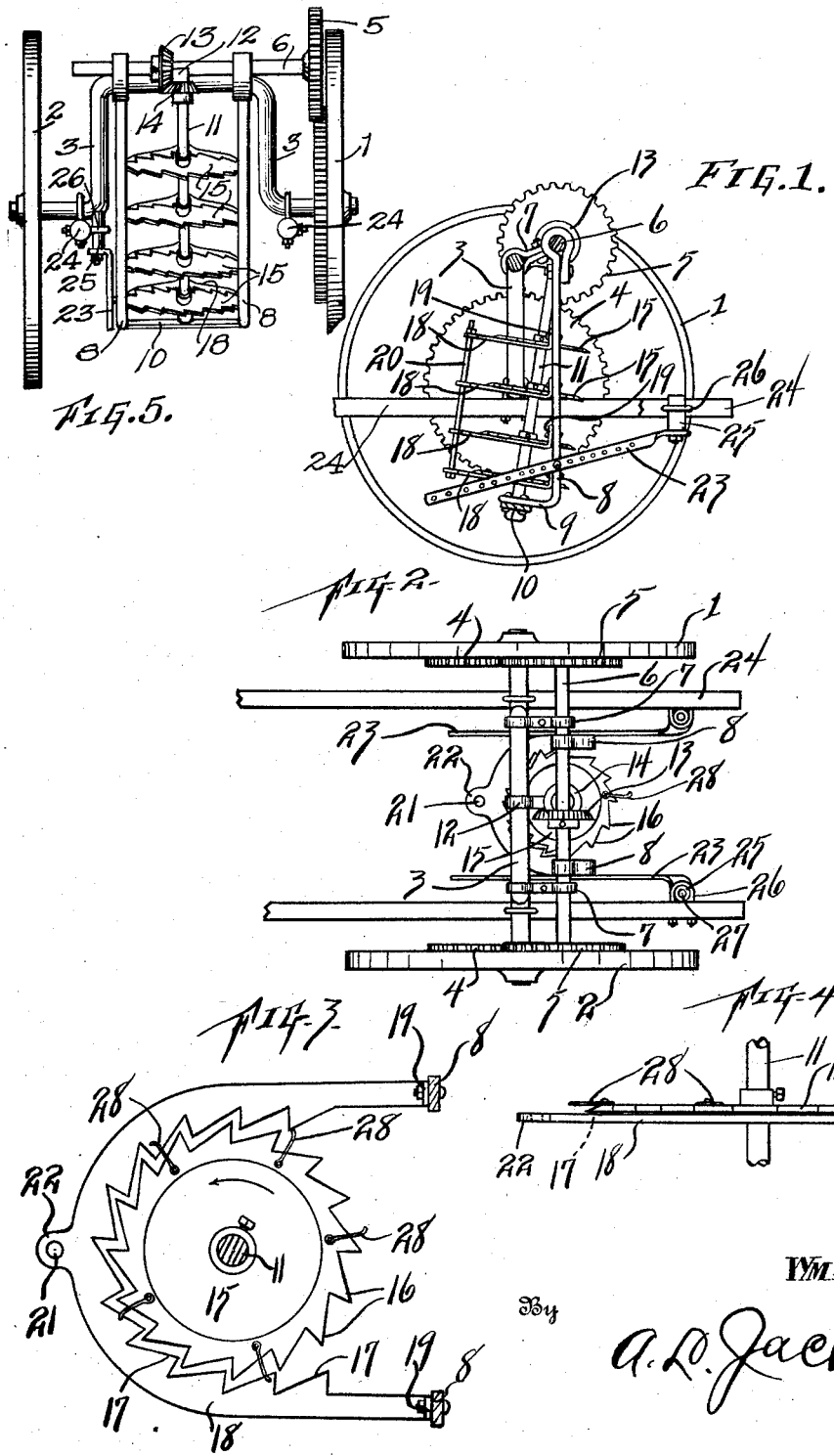

1,754,832

UNITED STATES PATENT OFFICE

WILLIAM A. MARTIN, OF FORT WORTH, TEXAS, ASSIGNOR OF ONE-HALF TO J. B. BLACKMAN, OF FORT WORTH, TEXAS

STALK CUTTER

Application filed July 11, 1927. Serial No. 204,923.

My invention relates to stalk cutters; and the object is to provide stalk cutters for cutting the stalks of cotton plants and weeds after the stalks are dead and to be destroyed and to provide devices for cutting the stalks in several places so that the stalks can be easily disposed of when the land is to be cleared. Other objects and advantages will be fully explained in the following description and the invention will be more fully pointed out in the claims.

Reference is had to the accompanying drawings which form a part of this application.

Fig. 1 is a side elevation of the stalk cutter.

Fig. 2 is a plan view of the same.

Fig. 3 is a detail view of two cutting devices, being a plan view.

Fig. 4 is a side elevation of the same.

Fig. 5 is a rear elevation of the truck showing the arched axle and its connections.

Similar characters of reference are used to indicate the same parts throughout the several views.

This invention employs a wheeled vehicle having wheels 1 and 2 which support an arched axle 3. Gear wheels 4 are rigid with the wheels 1 and 2 and mesh with drive gear wheels 5. A shaft 6 for gear wheels 5 is journaled in bearings 7 which are rigid with the axle 3. The gear wheels 5 drive the shaft 6. Hangers 8 are supported on shaft 6 loosely. A cross-bar 10 is attached to the hangers 8. These hangers 8 have horizontally projected portions 9 for supporting the cross-bar 10. An approximately vertical shaft 11 is journaled in the bar 10 and in a bearing 12 which is rigid with axle 3. A bevel gear wheel 13 is rigid with the shaft 6 and a bevel pinion 14 is attached to and rigid with the shaft 11 and is driven by the gear wheel 13. The object of the shaft 11 is to support and drive a plurality of disks or wheels 15. These disks are provided with pluralities of backwardly inclined cutters 16. These cutters co-operate with cutters 17 which are stationarily mounted on the hangers 8. The stationary cutters are carried by flat U-shaped bars 18 which are attached to the hangers 8, having angular portions 19 which are bolted to the hangers 8. The bars 18 are further braced by a rod 20 which extends through eyes 21 in tabs 22 formed on the bars 18. The rod 20 is fixedly connected to the tabs 22. The teeth or cutters 16 run in close proximity to the cutters 17 and effectually cut the stalks asunder. Enough disks 15 and bars 18 are provided to cut the stalks into as many parts as may be desirable. Means are provided for setting the hangers 18 at different angles. Adjusting bars 23 are connected to the horizontal frame members 24 by means of bearings 25 which are attached to the bars 24 by U-bolts 26 and the bars 23 are connected with the bearings 25 by means of vertical bolts 27. The bars 23 are provided with pluralities of holes so that the hangers 8 can be connected to the adjusting bars 23 at different points of adjustment. In this manner the hangers 8 can be set at different angles for varying the angles of the disks 15 and the bars 18.

Gathering arms 28 are attached to the disks 15 for aiding in bringing the stalks within the reach of the cutters 16 and 17.

What I claim, is,—

1. A stalk cutter comprising a wheeled truck provided with an arched axle and a horizontal frame, a working shaft and bearings rigid with said arched axle for said working shaft, gearing for driving said working shaft from the wheels of said truck, hangers suspended from said working shaft and a bearing bar carried thereby; a substantially vertical shaft journaled in said bearing bar and a bearing rigid with said arched axle for the upper end of said vertical shaft, beveled gear wheels on said working shaft and vertical shaft for driving said vertical shaft, stationary cutters attached to said truck, rotary cutters mounted on and driven by said vertical shaft and co-operating with said stationary cutters and a bar attached to said horizontal frame for varying the angle of said shaft and hangers.

2. A stalk cutter comprising a wheeled truck provided with an arched axle, a working shaft and bearings rigid with said arched axle for supporting said working shaft, gearing for driving said working shaft from the wheels of the truck, hangers suspended from said working shaft and a bearing bar carried thereby, a substantially vertical shaft journaled in said bearing bar and a bearing rigid with said arched axle for the upper end of said working shaft, beveled gear wheels on said working shaft and vertical shaft for driving said vertical shaft, curved bars attached rigidly to said truck and superposed one above the other, stationary cutters within the curved portions of said bars and integral therewith, rotary cutters mounted on said vertical shaft and running in the curved portions of said bars, and means for varying the positions of said cutters relative to the surface of the ground over which the truck is traveling.

In testimony whereof, I set my hand, this 1st day of February, 1927.

WILLIAM A. MARTIN.